(12) United States Patent
Shih

(10) Patent No.: US 6,798,545 B1
(45) Date of Patent: Sep. 28, 2004

(54) SCANNER WHICH CAN INPUT VARIOUS SYMBOLS TO CONTROL OPERATIONS

(75) Inventor: Po-Sheng Shih, Hsin-chu (TW)

(73) Assignee: Avision Inc., Hsin-Chu Hsien (TW)

( * ) Notice: Subject to any disclaimer, the term of this patent is extended or adjusted under 35 U.S.C. 154(b) by 641 days.

(21) Appl. No.: 09/639,824

(22) Filed: Aug. 17, 2000

(30) Foreign Application Priority Data

Mar. 10, 2000 (TW) ........................................ 89104334 A

(51) Int. Cl.[7] .............................................. H04N 1/04
(52) U.S. Cl. ...................... 358/474; 358/497; 358/448; 341/20; 341/23; 341/28
(58) Field of Search ................................ 358/474, 496, 358/497, 448; 341/20, 23, 28

(56) References Cited

U.S. PATENT DOCUMENTS

| | | | | |
|---|---|---|---|---|
| 5,754,713 A | * | 5/1998 | Deguchi et al. | 382/313 |
| 5,822,080 A | * | 10/1998 | Chavez | 358/474 |
| 6,388,772 B1 | * | 5/2002 | Williams | 358/448 |
| 6,577,907 B1 | * | 6/2003 | Czyszczewski et al. | 700/17 |

* cited by examiner

*Primary Examiner*—Edward Coles
*Assistant Examiner*—Heather D Gibbs
(74) *Attorney, Agent, or Firm*—Winston Hsu

(57) ABSTRACT

A scanner includes a housing, a control circuit positioned in the housing, the control circuit being used to control the operations of the scanner, a scanning module positioned in the housing and electrically connected to the control circuit, the scanning module being used to scan a document and generate associated document image signals, and an input device positioned on the housing and electrically connected to the control circuit, the input device being used to input proofreading symbols, alpha-numeric symbols, or special symbols to generate an associated input signal, the control circuit using the input signal to control the scanner.

14 Claims, 5 Drawing Sheets

SCANNER WHICH CAN INPUT VARIOUS SYMBOLS TO CONTROL OPERATIONS

BACKGROUND OF THE INVENTION

1. Field of the Invention

The present invention relates to a scanner, and more particularly, to a scanner that can input various symbols to control operations.

2. Description of the Prior Art

Please refer to FIG. 1 and FIG. 2. FIG. 1 is a perspective view of a prior art scanner 10. FIG. 2 is a functional block diagram of the scanner 10 shown in FIG. 1. The scanner 10 includes a housing 12, a control circuit 14 positioned in the housing 12 that is used to control the operations of the scanner 10, a scanning module 16 positioned in the housing 12 and electrically connected to the control circuit 14, the scanning module 16 being used to scan a document and generate associated document image signals, a user interface 20 positioned on the housing 12 and electrically connected to the control circuit 14, and a display panel 22 positioned on the surface of the housing 12 and electrically connected to the control unit 14, the display panel 22 being used to display information from the control circuit 14. The user interface 20 includes a plurality of buttons 21, which are used to provide input signals.

The control circuit 14 includes a memory 24 for storing programs and data, and a processor 26 for executing the programs stored in the memory 24. The programs stored in the memory 24 include an operating system 28 for managing program operations of the processor 26, a scan control program 30 executing under the operating system 28, the scan control program 30 controlling the operations of the scanning module 16 and processing the document image signals generated by the scanning module 16, a user interface control program 32 executing under the operating system 28 that controls the operations of the user interface, a panel control program 34 executing under the operating system 28 that controls the operations of the display panel 22, and an application program 36 executing under the operating system 28, the application program 36 using the display panel 22 to display button signals entered by the user, or to display associated control information generated by the operating system 34, and using the associated input signal generated by the user interface control program 32 to set up an operating mode of the scan control program 30 and to determine a processing procedure of the document image signals.

The control circuit 14 uses the associated input signal generated by the user interface 20 to control the operations of the scanner 10 and to display the button signals entered by the user, or to display associated control information on the display panel 22. Because space on the housing 12 is limited, only a few buttons can be set on the housing 12, and so users cannot input proofreading symbols, alpha-numeric symbols, or special symbols to execute specific functions, such as proofreading processing. However, with the growth of networking technology, more and more users desire a scanner with networking functionality. In this manner they can convey scanned image information to other machines via the Internet or a local network. The information could be delivered, for example, to an e-mail address. Network addresses include a variety of symbols, such as English characters, numeric symbols, special symbols ("@", ".", "_", "–", ":", "/" . . . etc.), or specific function keys. Thus, a scanner that can input various symbols is a basic requirement for connecting to a network.

SUMMARY OF THE INVENTION

It is therefore a primary objective of the present invention to provide a scanner that can input various symbols so as to solve the above-mentioned problems.

In a preferred embodiment, the scanner includes a housing, a control circuit positioned in the housing, the control circuit being used to control the operations of the scanner, a scanning module positioned in the housing and electrically connected to the control circuit, the scanning module being used to scan a document and generate associated document image signals, and an input device positioned on the housing and electrically connected to the control circuit. The input device may be a microphone, a touch-sensitive panel, or an input display panel, and is used to input proofreading symbols, alpha-numeric symbols, or special symbols to generate an associated input signal. The control circuit uses these input signals to control the scanner.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
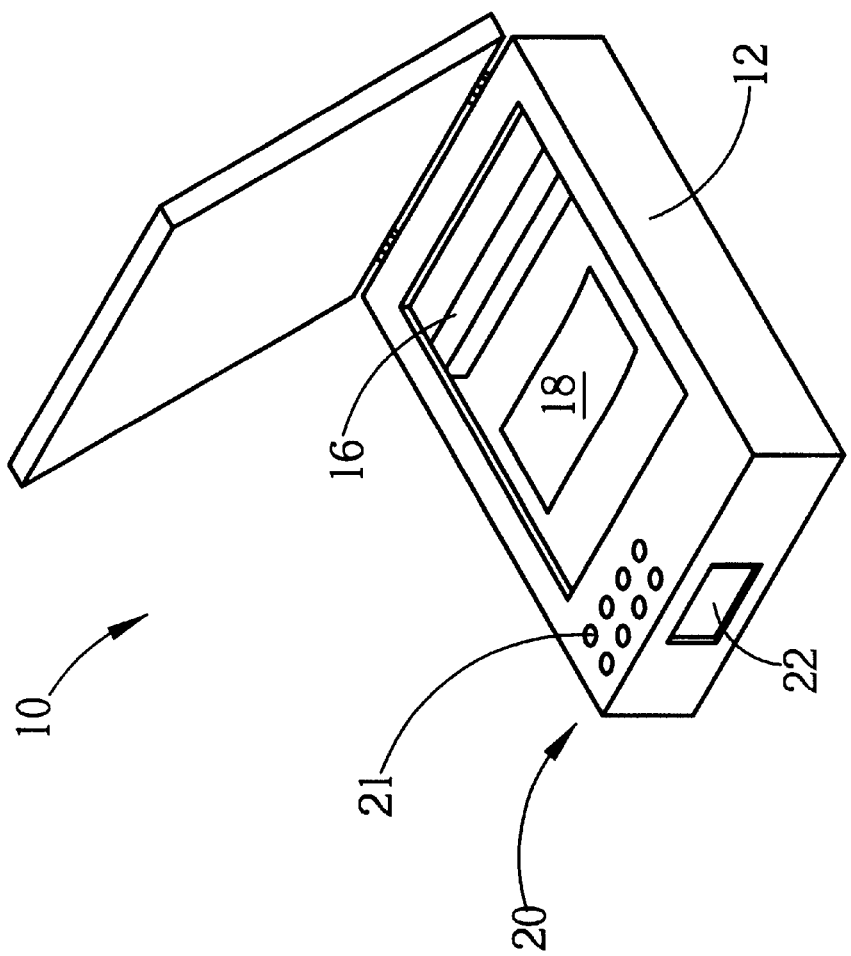
FIG. 1 is a perspective view of a prior art scanner.
Figure 2:
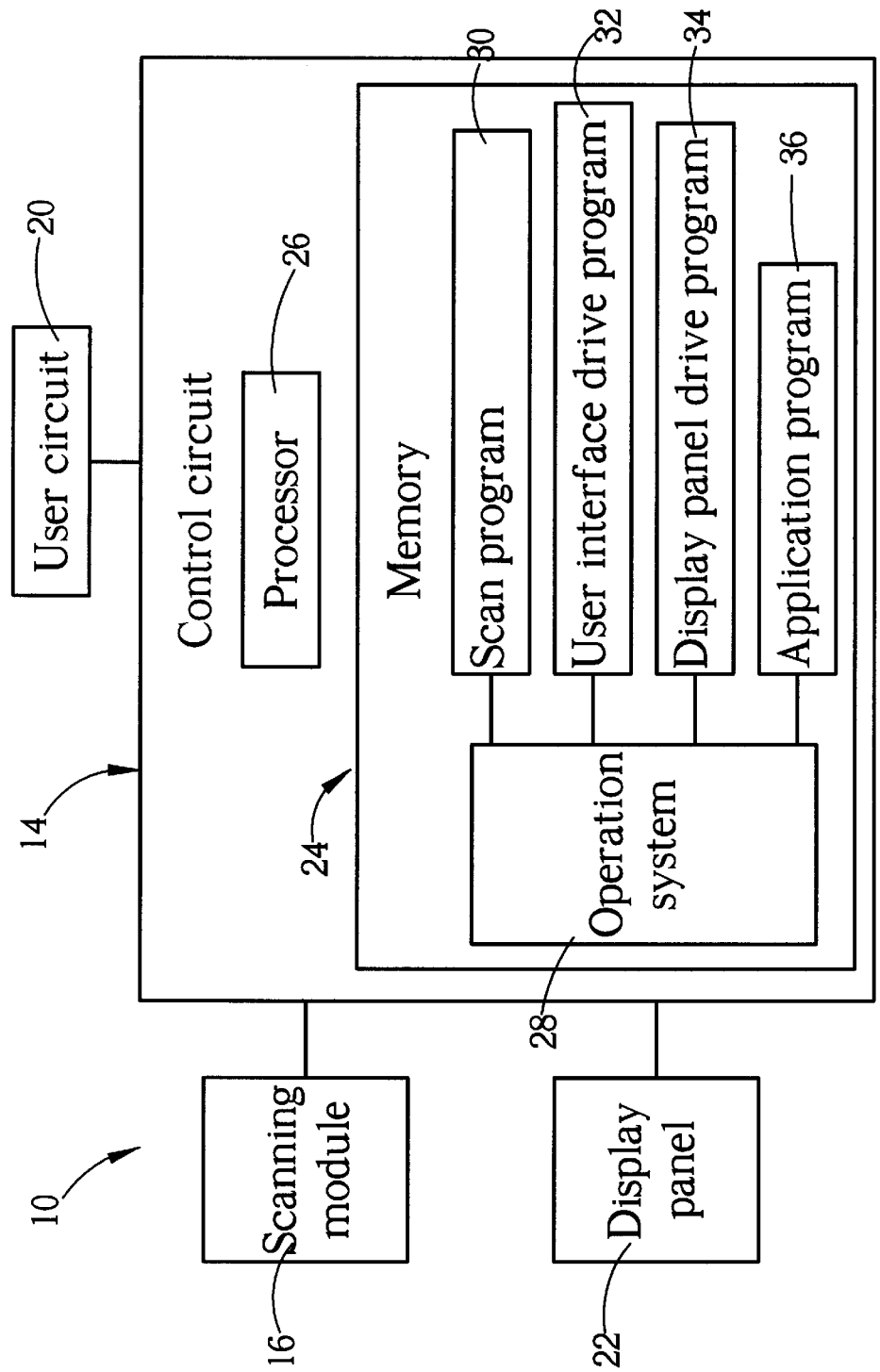
FIG. 2 is a functional block diagram of the scanner shown in FIG. 1.
Figure 3:
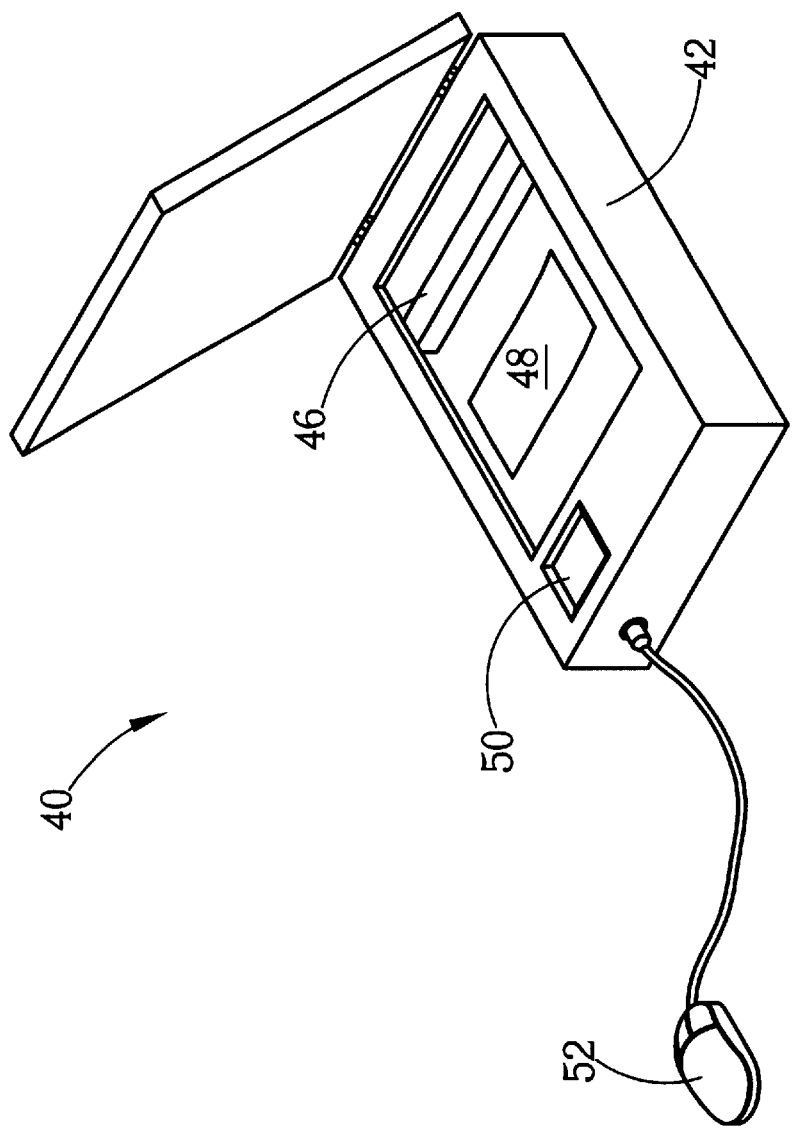
FIG. 3 is a perspective view of a scanner according to the present invention.
Figure 4:
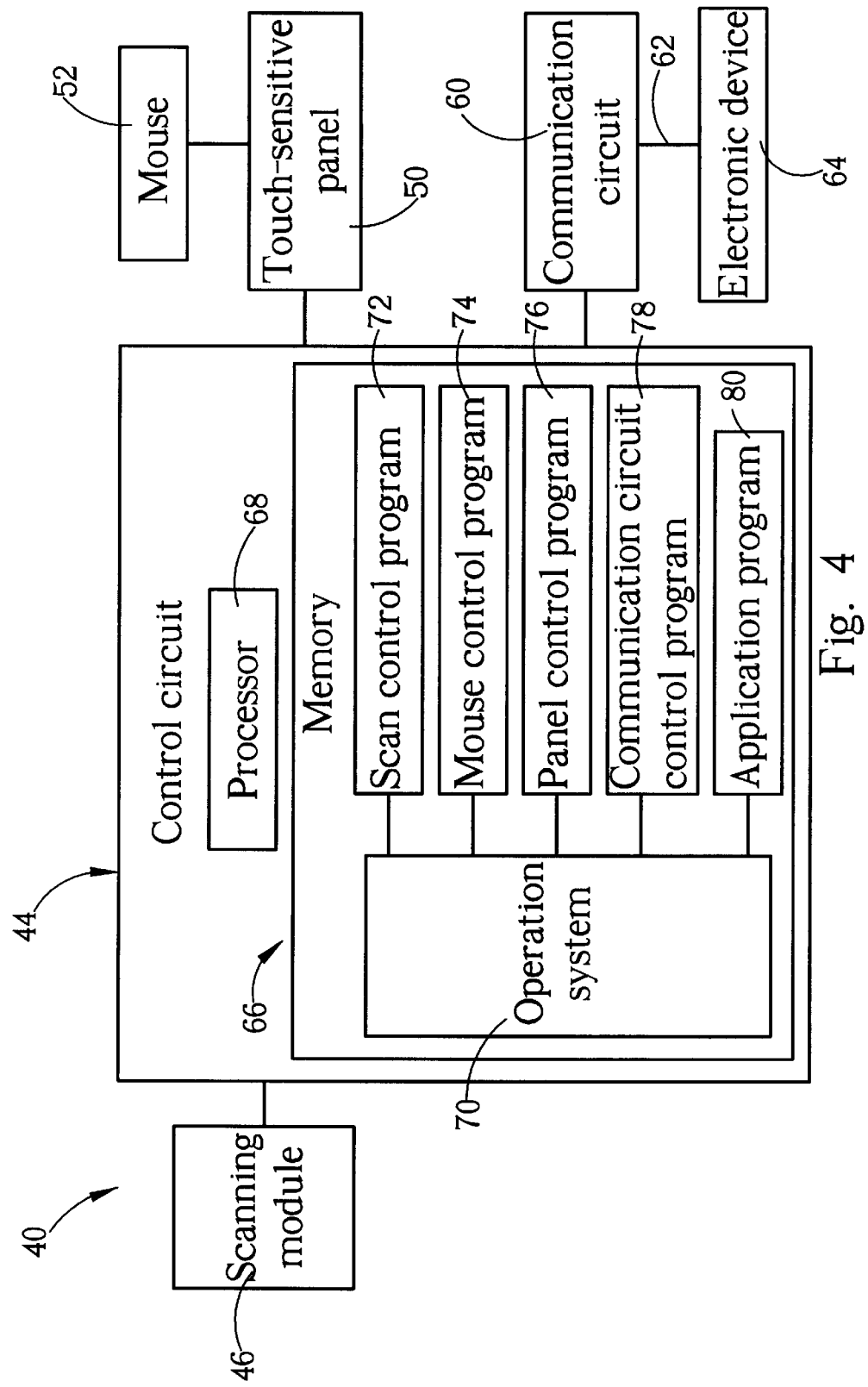
FIG. 4 is a functional block diagram of the scanner shown in FIG. 3.

Please refer to FIG. 3 and FIG. 4. FIG. 3 is a perspective view of a scanner 40 according to the present invention. FIG. 4 is a functional block diagram of the scanner 40 shown in FIG. 3. The scanner 40 includes a housing 42, a control circuit 44 positioned in the housing 42, a scanning module 46 positioned in the housing 42 and electrically connected to the control circuit 44, a touch-sensitive panel 50 positioned on the surface of the housing 42 and electrically connected to the control circuit 44, a mouse 52 connected to the touch-sensitive panel 50, and a communication circuit 60 for electrically transmitting information through a cable 62 to electrically connect to another electronic device 64.

The control circuit 44 controls the operations of the scanner 40. The scanning module 46 is used to scan a document 48 and generate associate document image signals. The touch-sensitive panel 50 displays a picture of a keyboard having a plurality of proof-reading symbols, alpha-numeric symbols, or special symbols. The user can use the mouse 52 to control the picture of the keyboard.

The user can touch the picture of the keyboard showed on the touch-sensitive panel 50 to input proofreading symbols, alpha-numeric symbols, or special symbols and to generate associated input signals. The touch-sensitive panel 50 is an input display panel, and the user can use the mouse 52 to control the picture of the keyboard to input various signals. The control circuit 44 controls the operations of the scanner 40 according the symbols entered by the user, and will display related control messages on the touch-sensitive panel 50.

The control circuit 44 includes a memory 66 for storing programs and data, and a processor 68 for executing the programs stored in the memory 66. The programs stored in the memory 66 includes an operating system 70, a scan control program 72, a mouse control program 74, a panel control program 76, a communication circuit control program 78, and an application program 80.

The operating system 70 manages program operations of the processor 68, and all other programs run under the operating system. The scan control program 72 controls the operations of the scanning module 46, and processes the document image signals generated by the scanning module 46. The mouse control program 74 controls the operations of the mouse 52. The panel control program 76 controls the touch-sensitive panel 50, displaying the picture of the keyboard on the touch-sensitive panel 50 and generating the associated input signals based upon input entered by the user when using the plurality of buttons on the picture of the keyboard. The communication circuit control program 78 controls the operations of the communication circuit 60.

The application program 80 uses the touch-sensitive panel 50 to display the various symbols entered by the user, or to display associated control information generated by the operating system 70. The application program 80 uses the associated input signal generated by the panel control program 76 to set up an operating mode of the scan control program 72, and determines a processing procedure of the document image signals. The application program 80 also uses the communication circuit control program 78 to transmit document image signals to the electronic device 64.

If the electronic device 64 is a network, then the application program 80 can be an e-mail processing program. In this case, the document image signals are transmitted across the network in an electronic mail (e-mail) format. The electronic device 64 may be a printer, in which case the application program 80 can be a document print processing program, and the document image signals are transmitted to the printer through the communication control program 78 to make a printout. Or the electronic device 64 could be a personal computer, the application program 80 being a document scan processing program, and the document image signals are transmitted to the personal computer through the communication circuit control program 78.

To suit the various electronic devices mentioned above, the communication circuit 60 may be a modem or a signal transfer circuit, the cable 62 being a phone line, and the modem and the phone line are used to transmit the document image signals to the electronic device 64. Or the communication circuit 60 is a network card, a network interface circuit, a standard printer interface circuit, or a computer interface circuit (such as SCSI, EPP, IEEE1284.3 or RS232), the cable 62 is an appropriate network cable, and the network card and the network cable are used to transmit the document image signals to the electronic device 64.

Figure 5:
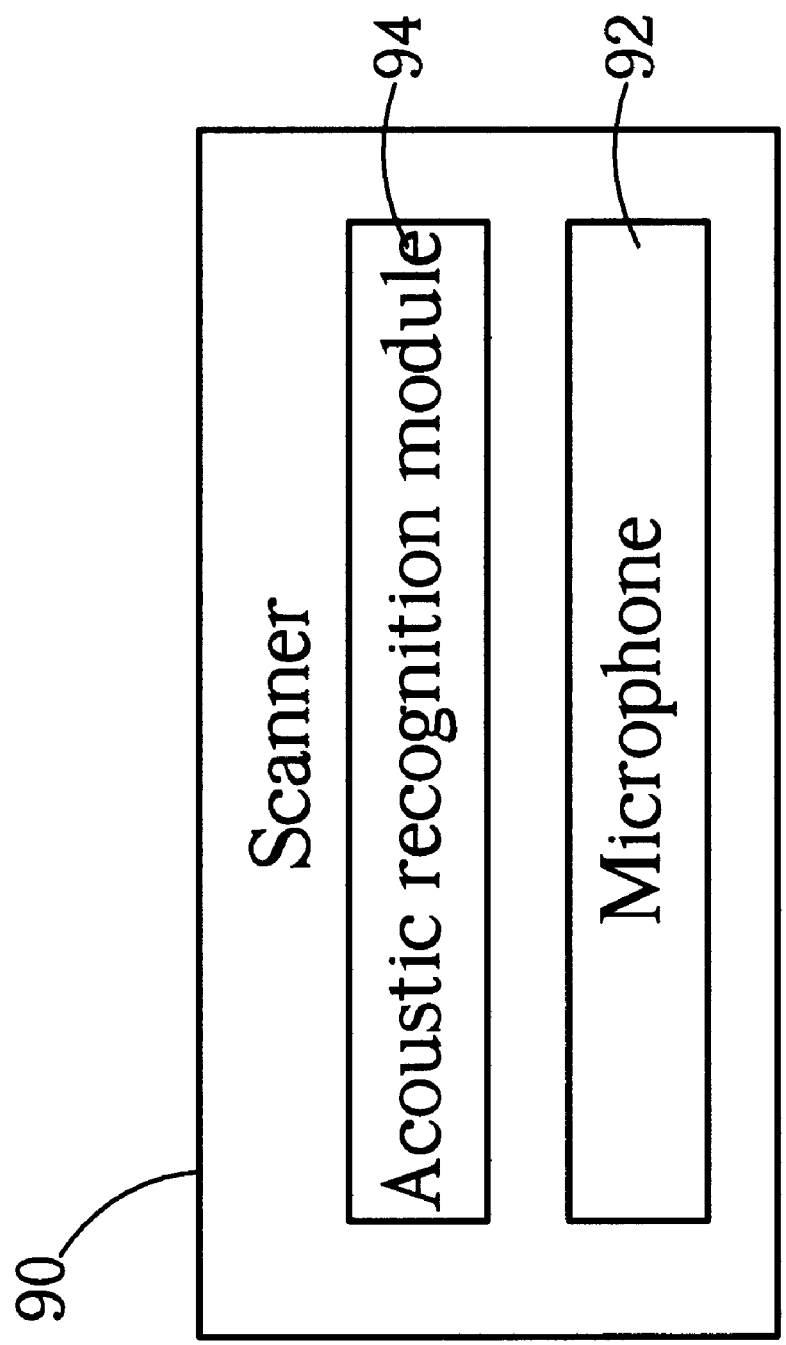
FIG. 5 is a functional block diagram of an alternative scanner according to the present invention.

Please refer to FIG. 5. FIG. 5 is a functional block diagram of an alternative scanner 90 according to the present invention. The scanner 90 includes a microphone 92 for inputting an acoustic signal, and an acoustic recognition module 94 for translating the acoustic signal into an associated input signal. In this embodiment, because each acoustic signal corresponds to a proofreading symbol, alpha-numeric symbol, or a special symbol, the control circuit 44 can use the input signal to control the scanner 90.

In contrast to the prior art scanner 10, the present invention scanner 40 has a touch-sensitive panel 50. Using the touch-sensitive panel 50, a user can conveniently input proofreading symbols, alpha-numeric symbols, or special symbols to control the scanner 40. Additionally, the user can use the mouse 52 to control the picture of the keyboard on the touch-sensitive panel 50. A microphone 92 can be installed on the scanner 90, so the user can input an acoustic signal to enter proofreading symbols, alpha-numeric symbols, or special symbols. Consequently, no computer is required to input the various symbols for networking. Document image signals can be transmitted from the communication circuit 60 across the network to a receiver's e-mail address in an electronic mail (e-mail) format. Similarly, symbols can be directly entered to input a fax number of the receiver, using the touch-sensitive panel 50 or the microphone 92 on the scanner 40, 90, and the document image signals are then processed by the application program 80 and transmitted to the receiver's fax machine. Or, printer control parameters can be selected using the touch-sensitive panel 50 or the microphone 92 on the scanner 40, 90, such as the number of copies, paper size, type of the printer, or tint. Prior to the present invention, because prior art scanners lack a sufficient number of buttons (for example, no scanner can input the "@" symbol, but this symbol is necessary for an e-mail address), all image information scanned by the scanner had to be processed through an application program in a computer, and data had to be entered using the keyboard of the computer to execute the above functions. Because these procedures can be complex, many users who are unfamiliar with the operations of the computer may not be able to utilize the high quality image data offered by the scanner. The present invention not only simplifies the operation of the scanner, but also provides fax, copy, and e-mail transmitting and receiving functions, all in one scanner, without requiring a computer. Even so, the present invention can also be used in the traditional way under a computer.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner comprising:

a housing;

a control circuit positioned in the housing, the control circuit being used to control the operations of the scanner;

a scanning module positioned in the housing and electrically connected to the control circuit, the scanning module being used to scan a document and generate associated document image signals;

an input display panel positioned on the housing and electrically connected to the control circuit, the input display panel displaying a picture of a keyboard having a plurality of proofreading symbols, alpha-numeric symbols, or special symbols, the input display panel being used to input proofreading symbols, alpha-numeric symbols, or special symbols to generate an associated input signal, the control circuit using the input signal to control the scanner; wherein the user can use the picture of the keyboard to generate the associated input signal, and the control circuit will display related control messages on the input display panel; and a mouse connected to the input display panel, the user capable of using the mouse to control the picture of the keyboard to generate the associated input signal;

wherein the control circuit comprises a memory for storing programs and data, and a processor for executing the programs stored in the memory, the programs stored in the memory comprising:

an operating system for managing program operations;

a scan control program executing under the operating system, the scan control program controlling the operations of the scanning module and processing the document image signals generated by the scanning module;

a mouse control program executing under the operating system, the mouse control program controlling the operations of the mouse;

a panel control program executing under the operating system, the panel control program displaying the picture of the keyboard on the input display panel, and generating the associated input signals according to input entered by the user using the plurality of buttons on the picture of the keyboard; and an application program executing under the operating system, the application program using the display panel to display the various symbols entered by the user, or to display associated control information generated by the operating system, and using the associated input signal generated by the panel control program to set up an operating mode of the scan control program and to determine a processing procedure of the document image signals.

2. The scanner of claim 1 further comprising a communication circuit for electrically transmitting information through a cable to electrically connect to another electronic device, and the memory further comprising a communication circuit control program that executes under the operating system, the communication circuit control program controlling operations of the communication circuit; wherein the application program can use the communication circuit control program to transmit the document image signals to the electronic device.

3. The scanner of claim 2 wherein the electronic device is a network, the application program is an e-mail processing program, and the document image signals are transmitted across the network in an electronic mail (e-mail) format.

4. The scanner of claim 2 wherein the electronic device is a printer, the application program is a document print processing program, and the document image signals are transmitted to the printer through the communication control program to make a printout.

5. The scanner of claim 2 wherein the electronic device is a personal computer, the application program is a document scan processing program, and the document image signal can be transmitted to the personal computer through the communication circuit control program.

6. The scanner of claim 2 wherein the communication circuit is a modem, the cable is a phone line, and the modem and the phone line are used to transmit the document image signals to the electronic device.

7. The scanner of claim 2 wherein the communication circuit is a network card, the cable is a network cable, and the network card and the network cable are used to transmit the document image signals to the electronic device.

8. A scanner comprising:

a housing;

a control circuit positioned in the housing, the control circuit being used to control the operations of the scanner;

a scanning module positioned in the housing and electrically connected to the control circuit, the scanning module being used to scan a document and generate associated document image signals; and an input display panel positioned on the housing and electrically connected to the control circuit, the input display panel displaying a picture of a keyboard having a plurality of proofreading symbols, alpha-numeric symbols, or special symbols, the input display panel being used to input proofreading symbols, alpha-numeric symbols, or special symbols to generate an associated input signal, the control circuit using the input signal to control the scanner; wherein the input display panel is a touch-sensitive panel, and the user can touch the picture of the keyboard showed on the touch-sensitive panel to generate the associated input signal, and the control circuit will display related control messages on the input display panel;

wherein the control circuit comprises a memory for storing programs and data, and a processor for executing the programs stored in the memory, the programs stored in the memory comprising:

an operating system for managing program operations;

a scan control program executing under the operating system, the scan control program controlling the operations of the scanning module and processing the document image signals generated by the scanning module;

a panel control program executing under the operating system, the panel control program displaying the picture of the keyboard on the input display panel, and generating the associated input signals according to input entered by the user touching the plurality of buttons on the picture of the keyboard; and an application program executing under the operating system, the application program using the display panel to display the various symbols entered by the user, or to display associated control information generated by the operating system, and using the associated input signal generated by the panel control program to set up an operating mode of the scan control program and to determine a processing procedure of the document image signals.

9. The scanner of claim 8 further comprising a communication circuit for electrically transmitting information through a cable to electrically connect to another electronic device, and the memory further comprising a communication circuit control program that executes under the operating system, the communication circuit control program controlling operations of the communication circuit; wherein the application program can use the communication circuit control program to transmit the document image signals to the electronic device.

10. The scanner of claim 9 wherein the electronic device is a network, the application program is an e-mail processing program, and the document image signals are transmitted across the network in an electronic mail (e-mail) format.

11. The scanner of claim 9 wherein the electronic device is a printer, the application program is a document print processing program, and the document image signals are transmitted to the printer through the communication control program to make a printout.

12. The scanner of claim 9 wherein the electronic device is a personal computer, the application program is a document scan processing program, and the document image signal can be transmitted to the personal computer through the communication circuit control program.

13. The scanner of claim 9 wherein the communication circuit is a modem, the cable is a phone line, and the modem and the phone line are used to transmit the document image signals to the electronic device.

14. The scanner of claim 9 wherein the communication circuit is a network card, the cable is a network cable, and the network card and the network cable are used to transmit the document image signals to the electronic device.

* * * * *